(12) United States Patent
Skoglund et al.

(10) Patent No.: US 9,110,474 B2
(45) Date of Patent: *Aug. 18, 2015

(54) PRESSURE COMPENSATED FLOW RATE CONTROLLER WITH BTU METER

(71) Applicant: Flow Control Industries, Inc., Woodinville, WA (US)

(72) Inventors: Paul K. Skoglund, Medina, WA (US); Art Smith, Woodinville, WA (US); Ben Trueblood, Woodinville, WA (US); Christopher J. Robson, Renton, WA (US); Mark W. Kirchner, Seattle, WA (US)

(73) Assignee: Flow Control Industries, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,499

(22) Filed: Jun. 27, 2014

(65) Prior Publication Data

US 2014/0371926 A1    Dec. 18, 2014

Related U.S. Application Data

(63) Continuation of application No. 13/352,229, filed on Jan. 17, 2012, now Pat. No. 8,805,591.

(60) Provisional application No. 61/433,632, filed on Jan. 18, 2011.

(51) Int. Cl.
*F16K 37/00* (2006.01)
*F28F 27/00* (2006.01)
(Continued)

(52) U.S. Cl.
CPC ............ *G05D 16/2013* (2013.01); *F16K 37/00* (2013.01); *F28F 27/00* (2013.01);
(Continued)

(58) Field of Classification Search
CPC ............ F16K 37/00; F28F 27/00; G01F 1/34; G01F 1/363; G01F 1/37; G01F 1/50; G01F 1/74; G01F 1/88; G01F 15/005; G01F 25/0007; G01K 13/02; G01K 15/00; G01K 15/002; G01L 19/0007; G01L 19/0092; G05B 15/02; G05D 7/0635; G05D 7/0688; G05D 7/0694; G05D 16/2013
USPC ........... 700/276, 282; 137/2, 12; 165/58, 279, 165/281, 287, 288; 340/540, 611, 614; 374/135, 143
See application file for complete search history.

(56) References Cited

U.S. PATENT DOCUMENTS

4,608,560 A * 8/1986 Allgood .......................... 340/9.1
4,617,110 A * 10/1986 Hinojos et al. ................ 208/211
(Continued)

*Primary Examiner* — Robert Fennema
*Assistant Examiner* — Jennifer L Norton
(74) *Attorney, Agent, or Firm* — Perkins Coie LLP (57) ABSTRACT

Apparatus, systems, and methods related to a constant-flow control valve and BTU meter assembly that has a pressure independent, constant-flow control valve assembly connectable to the fluid-based heating or cooling system. A valve stem is connected to a valve member and is rotatable as a unit relative to a valve body to change the position of valve member to change a fluid flow rate through the valve. The valve member's position relative to the fluid path is directly related to the fluid flow rate. Pressure sensors measure the pressure of fluid entering and exiting the valve body. A BTU meter assembly is connected to the valve stem, which is rotatable relative to the BTU meter assembly. A position sensor of the BTU meter assembly detects a rotational position of the valve stem relative to the BTU body. A controller of the BTU meter assembly is coupleable to the position sensor, the pressure sensors, and the temperature sensors, and the controller determines the fluid flow rate based upon the pressure drop across the valve assembly and the rotational position of the valve stem. The controller also determines energy usage of the heating or cooling device based upon the flow rate and the temperature change across the heating or cooling device.

20 Claims, 5 Drawing Sheets

(51) Int. Cl.

| | | |
|---|---|---|
| G01F 1/34 | (2006.01) | |
| G01F 1/36 | (2006.01) | |
| G01F 1/37 | (2006.01) | |
| G01F 1/50 | (2006.01) | |
| G01F 1/74 | (2006.01) | |
| G01F 1/88 | (2006.01) | |
| G01F 15/00 | (2006.01) | |
| G01F 25/00 | (2006.01) | |
| G01K 13/02 | (2006.01) | |
| G01K 15/00 | (2006.01) | |
| G01L 19/00 | (2006.01) | |
| G05B 15/02 | (2006.01) | |
| G05D 7/06 | (2006.01) | |
| G05D 16/20 | (2006.01) | |

(52) U.S. Cl.
CPC ............... *G01F 1/34* (2013.01); *G01F 1/363* (2013.01); *G01F 1/37* (2013.01); *G01F 1/50* (2013.01); *G01F 1/74* (2013.01); *G01F 1/88* (2013.01); *G01F 15/005* (2013.01); *G01F 25/0007* (2013.01); *G01K 13/02* (2013.01); *G01K 15/002* (2013.01); *G01L 19/0007* (2013.01); *G01L 19/0092* (2013.01); *G05B 15/02* (2013.01); *G05D 7/0635* (2013.01); *G05D 7/0688* (2013.01); *G05D 7/0694* (2013.01); *G01K 15/00* (2013.01)

(56) References Cited

U.S. PATENT DOCUMENTS

| | | | |
|---|---|---|---|
| 5,138,845 A * | 8/1992 | Mannion et al. | 62/99 |
| 2004/0007186 A1* | 1/2004 | Saito | 118/724 |
| 2007/0234747 A1* | 10/2007 | Chen | 62/149 |
| 2008/0134699 A1* | 6/2008 | Leaver et al. | 62/129 |
| 2011/0010067 A1* | 1/2011 | Rubenbauer et al. | 701/70 |
| 2014/0246187 A1* | 9/2014 | Kawasuji et al. | 165/287 |

* cited by examiner

PRESSURE COMPENSATED FLOW RATE CONTROLLER WITH BTU METER

CROSS-REFERENCE TO RELATED APPLICATION

This application is a continuation of U.S. patent application Ser. No. 13/352,229, titled "PRESSURE COMPENSATED FLOW RATE CONTROLLER WITH BTU METER", filed Jan. 17, 2012, which is a non-provisional patent application that hereby claims priority to U.S. Provisional Patent Application No. 61/433,632, titled "Pressure Compensated Flow-Rate Controller With BTU Meter," filed Jan. 18, 2011, all of which is incorporated herein in their entirety by reference thereto.

TECHNICAL FIELD

Embodiments of the present invention are directed to flow rate controllers and BTU meters.

BACKGROUND

Flow control valves are used extensively to control fluid flow in heating and cooling systems used to control thermal loads in, as an example, buildings or other spaces. Conventional heating and chilled water systems system utilized the flow control valves control the flow of fluid through the system as needed to meet the heating or cooling needs, such as may be indicated by a thermostat or other control system. The systems also typically monitor the amount of energy being used in the heating and chilled water system via BTU (British Thermal Units) meters.

BTU meters are used in buildings to measure heat consumed in building HVAC systems for both performance monitoring and billing purposes. BTU meters for building applications are most commonly comprised of a computer connected to a liquid flow meter and temperature sensors before and after a heating or cooling load. The flow rate measured multiplied by the temperature difference across the heating or cooling coil multiplied by a constant is equal to the BTUs transferred to (cooling) or from (heating) the load.

U.S. Pat. No. 5,904,292 discloses an electrically driven valve connected to a cooling or heating load, such as a coil, with temperature sensors before and after the coil with the system controlled and monitored by a computer. This valve is not a pressure balanced device so a change in pressure drop across the valve section would result in change in flow rate measured in the built in flow meter. The motor would then need to adjust the stem. While making this adjustment valves in parallel with the valve undergoing adjustment would then be effected with respect to pressure drop. The result of the interdependence on all valves is that the flow rates will cycle in rate never reaching a constant flow through the heating or cooling coil.

SUMMARY

Aspects of the present invention are directed to flow rate controller and BTU meter assemblies, systems and methods that overcome drawbacks experienced in the prior art and provide additional benefits. In accordance with aspects of an embodiment, an energy consumption monitoring system is provided for a fluid-based heating or cooling system with a fluid flow therethrough. The system comprises a heating or cooling device at least a portion of which defines a heating or cooling load. A supply line is connected to the heating or cooling device, and a return line connected to the heating or cooling device. The supply line carries fluid to the heating or cooling device at a first temperature, and the return line carries fluid from the heating or cooling device at a second temperature different than the first temperature. A first temperature sensor is coupled to the supply line and is positioned to measure the first temperature. A second temperature sensor is coupled to the return line and is positioned to measure the second temperature, wherein the temperature difference between the first and second temperatures is the temperature change across the heating or cooling device or the load.

The system includes a pressure independent, constant-flow control valve assembly that has a valve body with an inlet, an outlet, a valve chamber therebetween, and a fluid path extending between the inlet, outlet and through the valve chamber. An adjustable valve member is in the valve chamber and is disposed in the fluid path. A valve stem connected to the valve member is rotatable relative to the valve body to adjust the valve member and to adjust a fluid flow rate through the fluid path. The position of the valve member relative to the fluid path is directly related to the fluid flow rate through the fluid path. A first fluid pressure sensor is positioned to measure the fluid pressure of fluid entering the inlet of the valve body, and a second fluid pressure sensor is positioned to measure the fluid pressure of fluid exiting the outlet of the valve body. The difference between the first and second pressures is the pressure drop across the valve.

A BTU meter assembly is connected to a portion of the valve stem projecting from the valve body, and the valve stem is rotatable relative to at least a portion of the BTU meter assembly. The BTU meter assembly comprises a BTU body and a position sensor, which is coupled to the BTU body and to the valve stem. The position sensor is configured to detect the rotational position of the valve stem. The BTU meter assembly has a controller coupled to the position sensor, to the first and second pressure sensors, and to the first and second temperature sensors. The controller is configured to determine the fluid flow rate based upon the pressure drop across the valve and the rotational position of the valve stem. The controller is configured to determine energy usage of the heating or cooling device in real time based upon the flow rate and the temperature change across the heating/cooling device or the load.

Aspects of one or more embodiments may include the following: the BTU meter can include a rotatable fitting connected to the BTU body, wherein the rotatable fitting is fixedly attached to the free end portion of the valve stem and is rotatable with the valve stem as a unit relative to the BTU and valve bodies. The position sensor is calibrated to detect the rotational position of the valve stem relative to a predetermined reference point directly related to a reference position of the adjustable valve member in the valve chamber. The BTU meter assembly can be carried by the pressure independent, constant-flow control valve assembly. The heating or cooling device can be a component of a heating and chilled water system, such as a heat exchanger, a boiler, a condenser, a chiller, or other component. The valve stem can be automatically adjustable in response to instructions from the controller. The valve stem, the valve member, and the rotatable fitting can be interconnected and rotatable together as a unit relative to the BTU body. The controller can be exterior of the BTU body.

Another aspect of the embodiments provides a constant-flow control valve and BTU meter assembly that comprises a pressure independent, constant-flow control valve assembly connectable to the fluid-based heating or cooling system. The assembly has a valve body with an inlet and an outlet, a valve chamber with a fluid path therein extending between the inlet and outlet, and an adjustable valve member in the valve chamber and disposed in at least a portion of the fluid path to define a throttle in the fluid path. A valve stem is connected to the valve member and is rotatable as a unit relative to the valve body to change the position of valve member to change a fluid flow rate through the valve body. The position of the valve member relative to the fluid path is directly related to the fluid flow rate through the fluid path. A first fluid pressure sensor is positioned to measure the fluid pressure of fluid entering the inlet of the valve body, and a second fluid pressure sensor is positioned to measure the fluid pressure of fluid exiting the outlet of the valve body. The difference between the first and second pressures is the pressure drop across the valve assembly.

A BTU meter assembly is connected to the free end portion of the valve stem, wherein the valve stem is rotatable relative to at least a portion of the BTU meter assembly. The BTU meter assembly has a BTU body and a position sensor coupled to the BTU body and to the valve stem. The position sensor is configured to detect a rotational position of the valve stem relative to the BTU body. The BTU meter assembly has a controller coupleable to the position sensor, to the first and second pressure sensors, and to the first and second temperature sensors. The controller being is to determine the fluid flow rate based upon the pressure drop across the valve assembly and the rotational position of the valve stem. The controller is configured to determine energy usage of the heating or cooling device in real time based upon the flow rate and the temperature change across the heating or cooling device.

Another aspect of the embodiments includes a method of determining energy consumption of a fluid-based heating or cooling system with a heating or cooling device and fluid flowing therethrough. The method comprises determining a first temperature of fluid flowing in a supply line to the heating or cooling device, and determining a second temperature of fluid flowing in a return line from the heating or cooling device. Further, determining a first fluid pressure of fluid entering an inlet of a pressure independent, constant-flow control valve assembly that controls a flow rate of the fluid in the fluid-based heating or cooling system. Further, determining a position of the valve stem relative to the valve body or the BTU body, and determining a second fluid pressure of fluid exiting the outlet of the control valve assembly, wherein a difference between the first and second fluid pressures corresponds to a pressure drop across the valve. Further, determining the flow rate of fluid passing through the control valve assembly based on the pressure drop across the valve and the position of the valve stem relative to the valve body or the BTU body, and determining energy consumption of the heating or cooling device in real time based upon the determined flow rate and the temperature change across the heating or cooling device.

Aspects of the method can include determining the first temperature with a first temperature sensor coupled to the controller and coupled to the supply line, and determining the second temperature includes sensing the second temperature with a second temperature sensor coupled to the controller and coupled to the return line. The method can include determining the flow rate by detecting a rotational position of the valve stem relative to a predetermined reference point associated with at least one of the valve body or the BTU body. The method can include determining the energy consumption of at least one of a heat exchanger, a boiler, a condenser, or a chiller. The method can also include determining the position of the valve stem with a position sensor that detects a rotational position of the valve stem relative to the valve body or the BTU body.

DETAILED DESCRIPTION

The present invention provides a flow control valve assembly with a flow control valve an integral BTU meter that overcomes drawbacks experienced in the prior art. The present disclosure describes a flow control valve assembly in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1A:
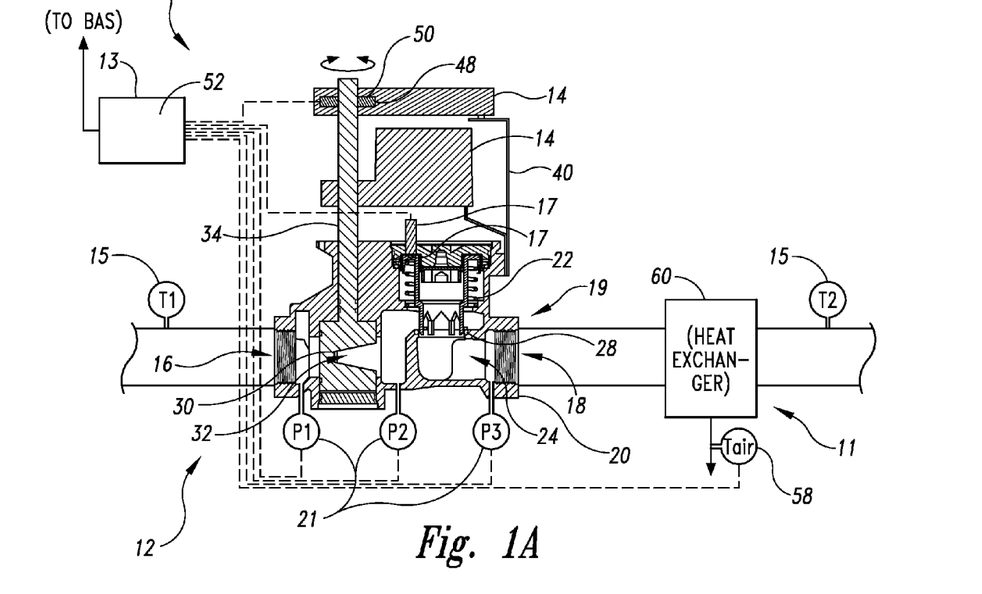
FIG. 1A is a schematic cross-sectional view of a pressure independent valve connected to a BTU meter in accordance with an aspect of the disclosure.
Figure 1B:
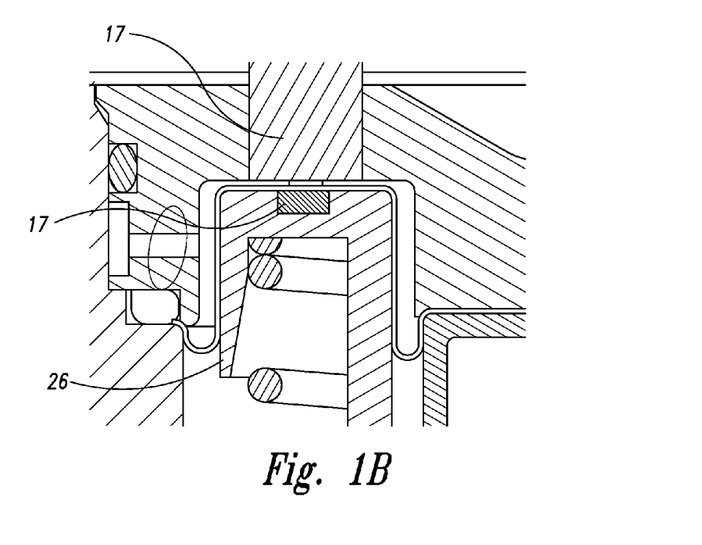
FIG. 1B is an enlarged cross-sectional view of a portion of the pressure independent valve of FIG. 1A.

FIG. 1 is a schematic, cross-sectional view of a flow control assembly 10 with a pressure compensated flow rate controller 12 and an integral BTU meter 14 in accordance with embodiments of the present invention. In the illustrated embodiment, the pressure compensated flow rate controller 12 is operatively connected to a computer 13 configured to monitor temperature sensors 15 before and after a heating or cooling device or load in a heating and chilled water system 11. The computer 13 can also monitor pressure sensors P1, P2 and P3 in addition to valve stem position (discussed in greater detail below) and an optional air temperature sensor. The position of an internal rate control piston 26 can also be monitored by a proximity sensor 17 that, in turn, is monitored by the computer 13.

The pressure compensated flow rate controller 12 in at least one embodiment includes a pressure independent flow control valve 19 that provides constant flow rate at the same stem set point with large fluctuations in pressure drop across the valve. Provided a minimum pressure drop is applied to the valve 19, the flow rate through the valve is very predictable for each stem set point. This rate control technology and a pressure independent flow rate controller are described in detail in U.S. Pat. No. 7,128,086, titled Flow Control Valves, issued Oct. 31, 2006, and which is incorporated herein in its entirety by reference thereto. This constant flow produces a system where valves and motor driven stems do not cyclically hunt in attempt to produce constant flow.

The computer 13 monitors the stem position and in combination with the P1 and P3 pressure sensors 21 to check for minimum pressure drop to infer the flow rate. This flow rate is then multiplied by the difference in temperature across the heating or cooling load (e.g. a coil) to determine the BTU rate being transferred. An alternate to measuring the P1 and P3 sensors 21 is to monitor the position sensor 17 and/or that the rate control piston 26 has moved into its throttling position which would be caused by a minimum pressure drop applied across the valve.

The stem inference and constant flow without cyclic hunting allows the stem position to substitute the flow meter listed in the 292 patent. Eliminating this flow meter eliminates a multitude of maintenance and calibration issues (such as fowling turbines in flow meters, regular calibration cycles for any flow meter) over the life of the building and produces a flow inference system that has a large range (turn down) and flow rate accuracy over the range that is associated with industrial flow meters that would be cost prohibitive for HVAC systems. Note: BTU meters in buildings use low cost turbine or impeller wheel meters that fowl so BTU meter in buildings are not that popular.

Constant flow through the cooling or heating load without cyclic rate allows for more accurate BTU rate monitoring than if a cyclic flow rate is applied because temperature sensors will experience delay in reading. This thermal delay is typically caused by a change in flow which typically causes a change in temperature through the coil.

FIGS. 1-5 show an embodiment of the assembly 10 in accordance with at least one embodiment of the invention. The illustrated assembly 10 has the flow control valve 19 integrally connected to the BTU meter 14. The flow control valve 19 is a high-performance pressure-independent constant flow configured to maintain a constant flow rate across the valve independent of any fluid pressure differentials or fluctuations between the inlet 16 and the outlet 18 of the valve. In one embodiment, the pressure independent flow control valve 19 is a DeltaP Valve®, manufactured and sold by Flow Control Industries, Inc., of Woodinville, Wash. Other embodiments can use other pressure independent flow control valves that provide sufficient accuracy and performance.

The valve 19 includes a housing 20 that defines the inlet 16 and the outlet 18 and that contains the internal components 22 of the valve, such as an internal passageway 24 connected to the inlet 16 and outlet 18, a spring biased piston 26 movably disposed adjacent to a piston seat 28 through which the water or other fluid can flow as the water moves through the flow passageway 24. The valve 19 includes a flow throttle 30 rotatably disposed in a cavity within the flow passageway 24. The flow throttle 30 has an opening 32 configured to selectively permit fluid to flow from the inlet 16, past the piston 26 and piston seat 28 (when the valve is not closed), to the outlet. The flow throttle 30 is connected to a valve stem 34 that is rotatably adjustable so as to rotate the flow throttle 30 within the flow passageway 24. Accordingly, the flow rate through the valve 19 can be very accurately adjusted by rotating the valve stem 34, thereby rotating and adjusting the flow throttle 30.

The valve 19 of the illustrated embodiment is a high performance valve with high "turn down", which equals the valve's highest flow rate divided by the lowest flow rate achievable. For a fixed valve orifice, the turn down is calculated by taking the square root of the highest pressure drop across the orifice divided by the lowest pressure drop. For example, a valve that offers a pressure drop across the orifice of 200 psi at maximum flow and 2 psi at minimum flow will have a turn down of 10:1. The valve 19 of the illustrated embodiment has a turn down of approximately 100:1, and the valve will operate in the pressure independent range from approximately 5-70 PSID (0.34-4.83 bar), inclusive. In other embodiments, the valve 19 can have a higher operating range of approximately 10-90 PSID (0.7-6.2 bar), inclusive. Other embodiments can include other high performance valves that have different turn downs and/or different operating ranges.

The valve 19 of the illustrated embodiment that provides a constant flow rate through the valve independent of pressure drops across the valve and that has the turn down of approximately 100:1, allows the user to very accurately control the fluid flow through the entire pressure independent range, by adjusting the stem 34 and the flow throttle 32.

Figure 2:
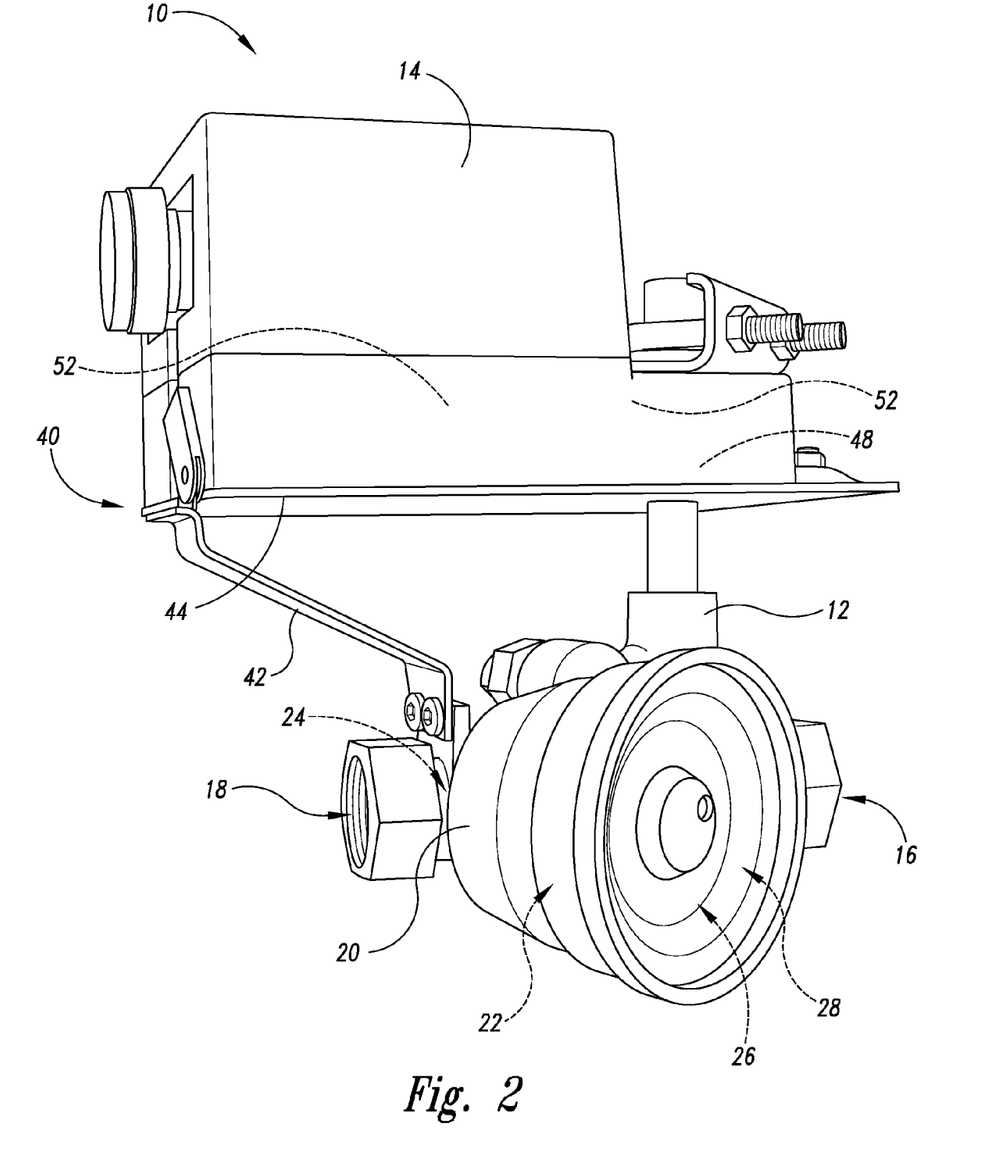
FIG. 2 is an isometric view of a flow control valve assembly with an integral BTU meter in accordance with an embodiment of the present invention.
Figure 3:
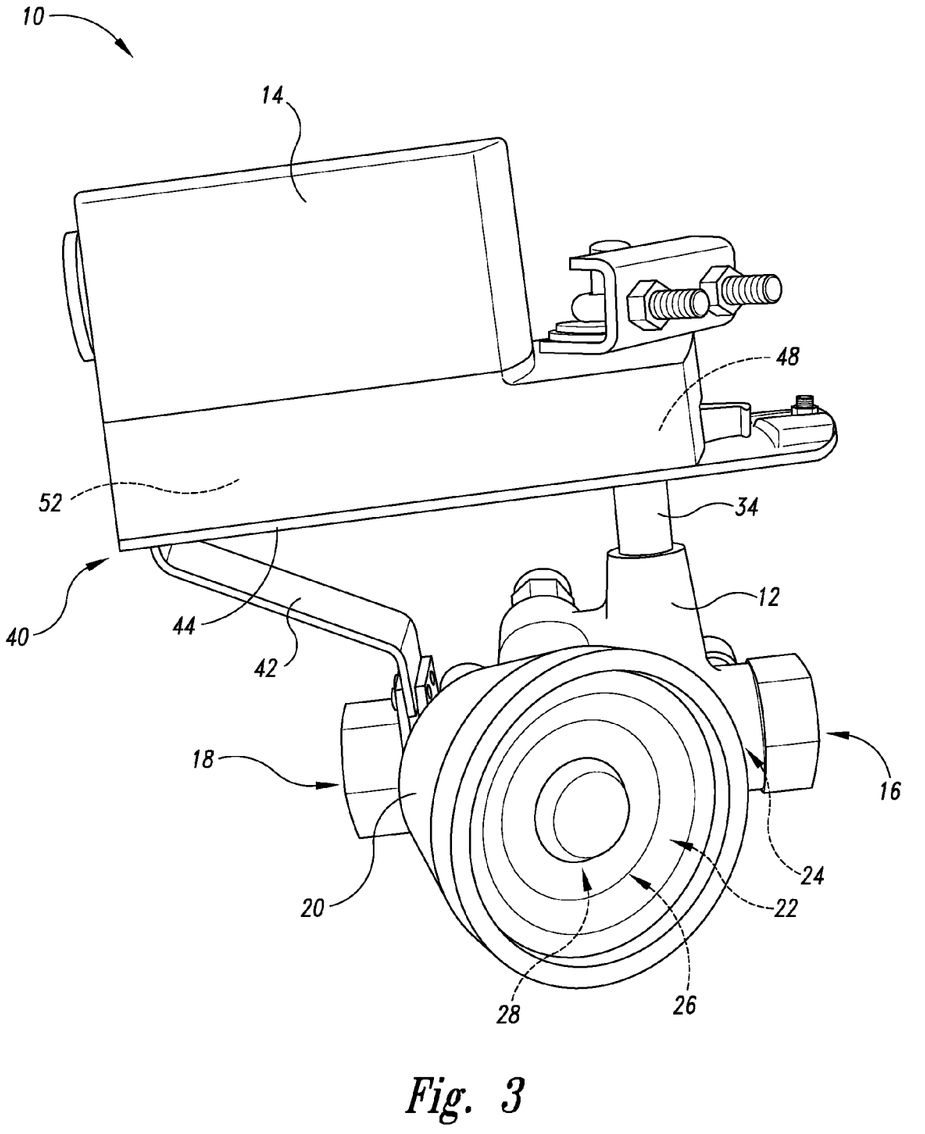
FIG. 3 is another isometric view of the flow control valve assembly with an integral BTU meter of FIG. 1.
Figure 4:
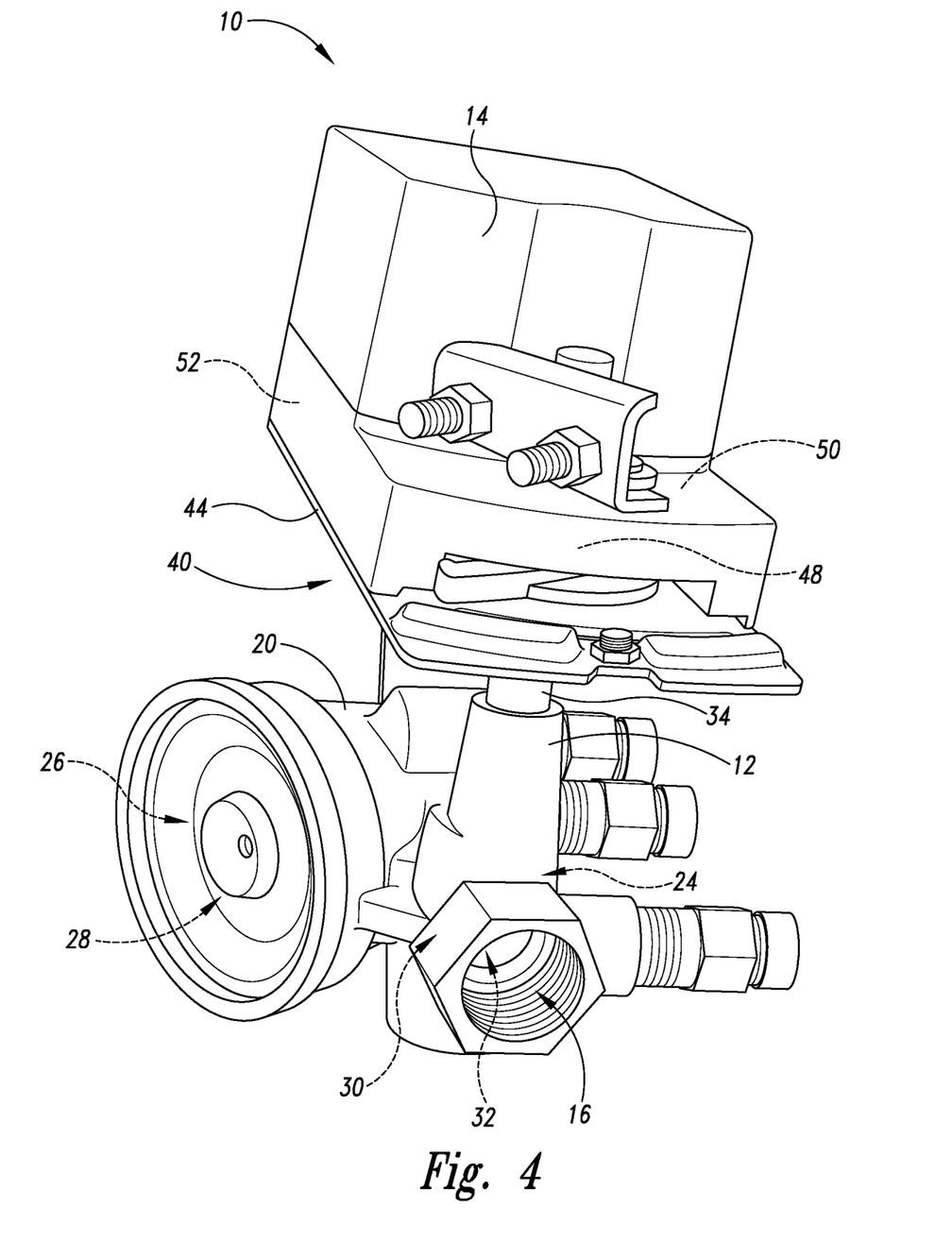
FIG. 4 is another isometric view of the flow control valve assembly with an integral BTU meter of FIG. 1.
Figure 5:
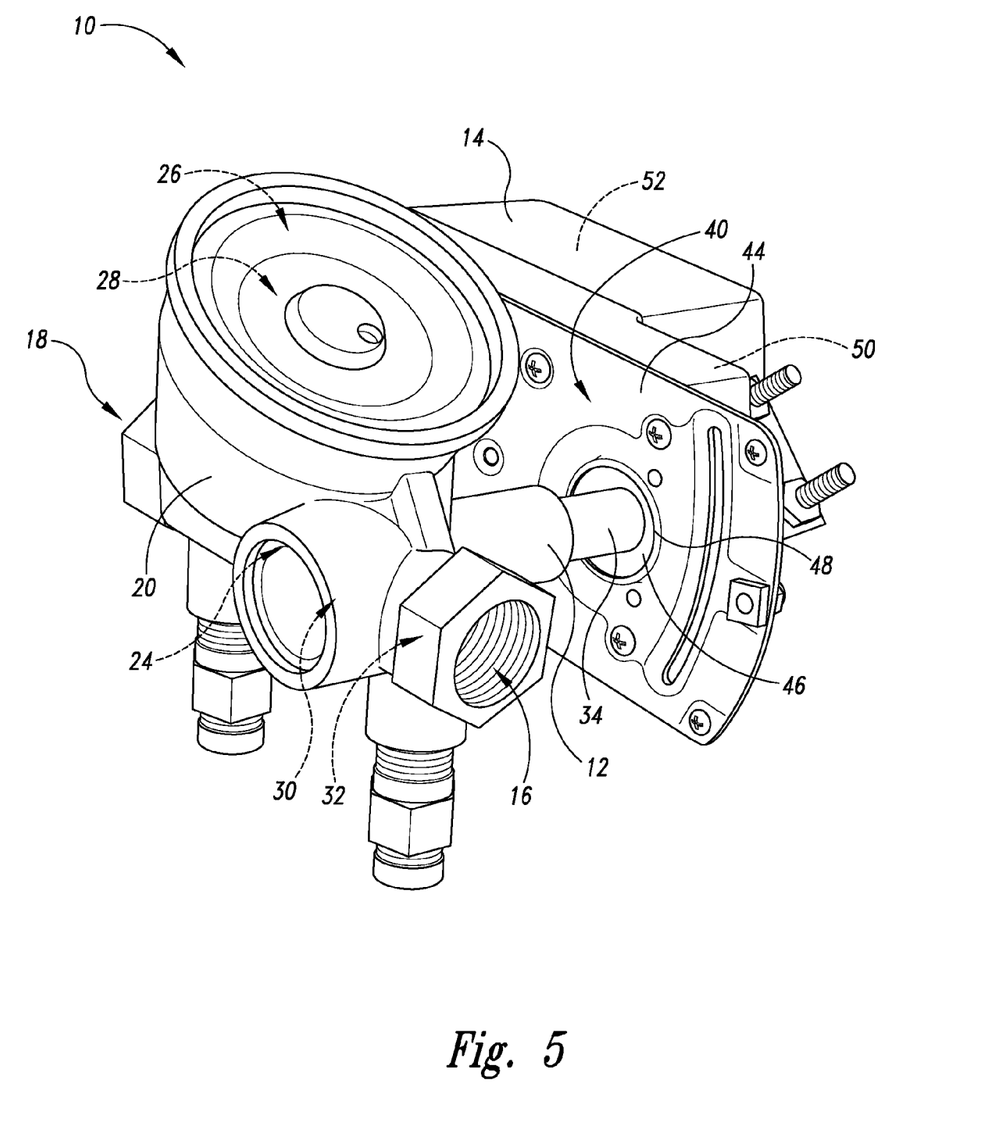
FIG. 5 is a bottom isometric view of the flow control valve assembly with an integral BTU meter of FIG. 1.

As seen in FIGS. 1-5, a support plate 40 has an attachment portion 42 securely attached to the valve 19, and a platform portion 44 attached to the arm portion 32. The BTU meter 14 mounted on the platform portion 44, so that the BTU meter is securely supported in a fixed position adjacent to the valve 19. As seen in FIGS. 2 and 5, the platform portion 44 has an aperture 46 therein coaxially aligned with the stem 34 of the valve 19. The stem 34 extends away from the valve's housing, and a distal end portion 40 of the stem 34 extends through the platform portion's aperture 46 and into a rotatable fitting 48 in the BTU meter. The stem 34 is fixedly attached to the rotatable fitting 48 so that when the stem is rotated (manually or automatically in response to instructions from a controller), the stem 34, the throttle 32, and the fitting 48 all rotate together as a unit relative to the BTU meter 14.

The BTU meter 14 has a position sensor 50 connected to the fitting 48 and calibrated to accurately and precisely detect the angular position of the fitting 48 and the stem 34 of the valve. The position sensor 50 is coupled to a controller 52 that received data about the rotational position of the fitting 48 and/or the stem 34. As indicated above, the valve 19 is a high performance pressure independent valve with a high turn down, which provides for very accurate control of the water flow rate through the valve. Once the stem 34 and throttle 30 have been rotated to a selected position the flow rate through the valve remains constant independent of pressure fluctuations. This highly accurate control of the fluid flow rate is such that the valve 19 can be calibrated to very accurately identify or determine the fluid flow rate through the valve based on the position of the stem 34 (e.g., the angular position of the stem), and thus the throttle 30. The position sensor 50 is also calibrated to accurately detect the position of the stem relative to a predetermined referenced point. Accordingly, the controller 52 uses the data from the position sensor about the position of the stem 34 to very accurately determine the actual flow rate of water through the valve 19.

In the illustrated embodiment, the controller 52 of the BTU meter 14 is coupled to temperature sensors 15 positioned at selected locations in a heating and cooling system 11, shown schematically. The controller 52 receives data from the temperature sensors 15, such as one temperature sensor for supply water and another for the return water of a heat exchanger. The controller 52 is configured to calculate the energy consumption based on the flow rate data and the temperature sensor data. The result is a very accurate measurement of energy consumption in real time by the BTU meter 14 because the calculation utilizes the actual flow rate information from the pressure independent constant flow rate to which the rotational position of the stem is accurately correlated and calibrated.

In at least one embodiment, the assembly includes an air temperature sensor 58 and air flow sensor 60 shown in FIG. 1. The air temperature sensor 58 and air flow sensor 60 can also be monitored by the computer 13 discussed above. In conjunction with fan on/off indication this sensor can be used to monitor cooling or heating coil performance. The air temperature sensors can also be used to control the stem position and to vary the flow fluid through the cooling or heating coil to maintain a desired air temperature.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A constant-flow control valve and BTU meter assembly coupleable to a fluid-based heating or cooling system with a heating or cooling device at least a portion of which defines a heating or cooling load, fluid supply and return lines connected to the heating or cooling device, and temperature sensors connected to the fluid supply and return lines and configured to measure fluid temperatures of supply fluid and return fluid relative to the heating or cooling device, wherein a temperature difference between the first and second temperatures is a temperature change across the heating or cooling load, the constant-flow control valve and BTU meter assembly comprising:
   a flow control valve assembly connectable to the fluid-based heating or cooling system, the flow control valve assembly having an inlet and an outlet a fluid path therein extending between the inlet and outlet, an adjustable valve member disposed in at least a portion of the fluid path, and a valve stem connected to the valve member and being rotatable as a unit to change the position of valve member, wherein the position of the valve member relative to the fluid path is directly related to the fluid flow rate through the fluid path;
   a first fluid pressure sensor positioned to measure the fluid pressure of fluid entering the inlet;
   a second fluid pressure sensor positioned to measure the fluid pressure of fluid exiting the outlet, wherein a difference between the first and second pressures is the pressure drop across the valve assembly; and
   a BTU meter assembly connected to the valve stem, wherein the valve stem is rotatable relative to at least a portion of the BTU meter assembly, the BTU meter assembly having a position sensor coupled to the valve stem, the position sensor being configured to detect a rotational position of the valve stem, the BTU meter assembly having a controller coupleable to the position sensor, to the first and second pressure sensors, and to the first and second temperature sensors, the controller being configured to determine the fluid flow rate based upon the pressure drop across the valve assembly and the rotational position of the valve stem, and the controller being configured to determine energy usage of the heating or cooling device based upon the flow rate and the temperature change across the heating or cooling load.

2. The assembly of claim 1 wherein the BTU meter comprises a BTU body and a rotatable fitting connected to the BTU body, the rotatable fitting being fixedly attached to the valve stem and being rotatable with the valve stem as a unit.

3. The assembly of claim 1 wherein the position sensor is calibrated to detect the rotational position of the valve stem relative to a predetermined reference point directly related to a reference position of the adjustable valve member.

4. The assembly of claim 1 wherein the BTU meter assembly is carried by the flow control valve assembly.

5. The assembly of claim 1 wherein the heating or cooling device is a component of a heating and chilled water system.

6. The assembly of claim 1 wherein the heating or cooling device is a heat exchanger, a boiler, a condenser, or a chiller.

7. The assembly of claim 1 wherein the BTU meter assembly has a BTU body securely supported in a fixed position adjacent to the flow control valve assembly.

8. The assembly of claim 1 wherein the valve stem is automatically adjustable in response to instructions from the controller.

9. The assembly of claim 1 wherein the BTU meter assembly has a BTU body, and the valve stem, the valve member, and the rotatable fitting are interconnected and are rotatable together as a unit relative to the BTU body.

10. The assembly of claim 1 wherein the BTU meter assembly has a BTU body, and the controller is exterior of the BTU body.

11. An energy consumption monitoring system for a fluid-based heating or cooling system with a fluid flow therethrough, comprising:
   a heating or cooling device;
   a supply line carrying fluid to the heating or cooling device at a first temperature;
   a return line carrying fluid from the heating or cooling device at a second temperature different than the first temperature;
   a first temperature sensor coupled to the supply line and positioned to measure the first temperature;
   a second temperature sensor coupled to the return line and positioned to measure the second temperature;
   a flow control valve assembly comprising a an inlet and an outlet, a fluid path extending between the inlet and the outlet, an adjustable valve member in the fluid path, and a valve stem connected to the valve member, the valve stem being rotatable to adjust the valve member and to adjust a fluid flow rate through the fluid path;
   a first fluid pressure sensor positioned to measure the fluid pressure of fluid entering the inlet;
   a second fluid pressure sensor positioned to measure the fluid pressure of fluid exiting the outlet, wherein a difference between the first and second pressures is the pressure drop across the valve; and
   a BTU meter assembly connected to the valve stem, wherein the valve stem is rotatable relative to at least a portion of the BTU meter assembly, the BTU meter assembly comprising a position sensor coupled to the valve stem, the position sensor being configured to detect the rotational position of the valve stem, the BTU meter assembly having a controller coupled to the position sensor, to the first and second pressure sensors, and to the first and second temperature sensors, the controller being configured to determine the fluid flow rate based upon the pressure drop across the valve and the rotational position of the valve stem, and the controller being configured to determine energy usage of the heating or cooling device in real time based upon the flow rate and the temperature change across the heating or cooling device.

12. The system of claim 11 wherein the BTU meter comprises a BTU body and a rotatable fitting connected to the BTU body, the rotatable fitting being fixedly attached to the valve stem and being rotatable with the valve stem as a unit.

13. The system of claim 11 wherein the position sensor is calibrated to detect the rotational position of the valve stem relative to a predetermined reference point directly related to a reference position of the adjustable valve member.

14. The system of claim 11 wherein the BTU meter assembly is carried by the flow control valve assembly.

15. The system of claim 11 wherein the heating or cooling device is a component of a heating and chilled water system.

16. The system of claim 11 wherein the heating or cooling device is a heat exchanger, a boiler, a condenser, or a chiller.

17. The system of claim 11 wherein the BTU meter assembly has a BTU body i-s securely supported in a fixed position adjacent to the flow control valve assembly.

18. The system of claim 11 wherein the valve stem is automatically adjustable in response to instructions from the controller.

19. The system of claim 11 wherein the valve stem, the valve member, and the rotatable fitting are interconnected and are rotatable together as a unit.

20. The system of claim 11 wherein the BTU meter assembly has a BTU body, and the controller is exterior of the BTU body.

* * * * *